United States Patent
Lindholm et al.

(10) Patent No.: US 9,560,084 B2
(45) Date of Patent: Jan. 31, 2017

(54) REALLOCATION OF SERVING PROXY FUNCTION IN IMS

(75) Inventors: Fredrik Lindholm, Stockholm (SE); Hubert Przybysz, Hagersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 356 days.

(21) Appl. No.: 13/256,962

(22) PCT Filed: Mar. 19, 2009

(86) PCT No.: PCT/EP2009/002033
§ 371 (c)(1),
(2), (4) Date: Sep. 16, 2011

(87) PCT Pub. No.: WO2010/105643
PCT Pub. Date: Sep. 23, 2010

(65) Prior Publication Data
US 2011/0320581 A1  Dec. 29, 2011

(51) Int. Cl.
*G06F 15/173* (2006.01)
*H04L 29/06* (2006.01)
*H04L 29/08* (2006.01)

(52) U.S. Cl.
CPC ....... *H04L 65/1073* (2013.01); *H04L 67/1002* (2013.01); *H04L 65/105* (2013.01); *H04L 65/1016* (2013.01)

(58) Field of Classification Search
CPC ..................................................... G06F 15/173
USPC ................................................. 709/223–226
See application file for complete search history.

(56) References Cited

U.S. PATENT DOCUMENTS

| | | | |
|---|---|---|---|
| 7,773,983 B2* | 8/2010 | Takeda | 455/420 |
| 7,912,041 B2* | 3/2011 | Song et al. | 370/352 |
| 8,571,548 B2 | 10/2013 | Poikselka et al. | |
| 2005/0065801 A1* | 3/2005 | Poikselka et al. | 705/1 |
| 2007/0153709 A1* | 7/2007 | Choi | 370/254 |
| 2011/0078316 A1* | 3/2011 | Tuohino et al. | 709/227 |

FOREIGN PATENT DOCUMENTS

| | | |
|---|---|---|
| CN | 1615630 A | 5/2005 |
| CN | 1852308 A | 10/2006 |
| WO | 03/061236 A1 | 7/2003 |
| WO | 2006/016839 A1 | 2/2006 |

OTHER PUBLICATIONS

Official Action from corresponding CN200980158308.6, dated Sep. 3, 2013, 19 pages.

(Continued)

*Primary Examiner* — Vivek Srivastava
*Assistant Examiner* — Sibte Bukhari
(74) *Attorney, Agent, or Firm* — Rothwell, Figg, Ernst & Manbeck, P.C.

(57) ABSTRACT

The invention relates to a method of changing allocation of Serving-Call Session Control Functions (S-CSCFs) to a user of an IMS network. The user is being provided with services via a first S-CSCF allocated to the user. The method includes implementing a re-allocation instruction at the first S-CSCF. The reallocation instruction includes criteria for de-allocation of the user from the first S-CSCF. The S-CSCF determines if the criteria are met; and if the criteria are met, de-allocates the user.

20 Claims, 4 Drawing Sheets

(56) References Cited

OTHER PUBLICATIONS

3rd Generation Partnership Project; Technical Specification Group Core Network and Terminals; IP multimedia call control protocol based on Session Initiation Protocol (SIP) and Session Description Protocol (SDP); Stage 3 (Release 8), 3GPP TS 24.229 V8.6.0, Valbonne, France, 600 pages, (Dec. 2008).

3rd Generation Partnership Project; Technical Specification Group Services and System Aspects; Feasibility Study on IMS Evolution; (Release 9), 3GPP TR 23.812 V0.3.0, Valbonne, France, 18 pages, (Jan. 2009).

3rd Generation Partnership Project; Technical Specification Group Services and System Aspects; Feasibility Study on IMS Evolution; (Release 9), 3GPP TR 23.812 V0.3.0, Valbonne, France, 19 pages, (Jan. 2009).

3rd Generation Partnership Project; Technical Specification Group Core Network and Terminals; IMS Restoration Procedures (Release 8), 3GPP TS 23.380.V8.1.0, Valbonne, France, 11 pages, (Dec. 2008).

3rd Generation Partnership Project; Technical Specification Group Services and System Aspects; IP multimedia Subsystem (IMS); Stage 2 (Release 8), 3GPP TS 23.228 V8.7.0, Valbonne, France, 244 pages, (Dec. 2008).

* cited by examiner

REALLOCATION OF SERVING PROXY FUNCTION IN IMS

CROSS-REFERENCE TO RELATED APPLICATION

This application is a 35 U.S.C. §371 National Phase Entry Application from PCT/EP2009/002033, filed Mar. 19, 2009, and designating the United States.

TECHNICAL FIELD

The present invention relates to the reallocation of a serving proxy function, or Serving-Call Session Control Function (S-CSCF) in an IP Multimedia Subsystem (IMS).

BACKGROUND

IP Multimedia Subsystem (IMS) is the technology defined by the Third Generation Partnership Project (3GPP) and ETSI TISPAN group to provide IP Multimedia services over mobile communication networks. (This technology is described in various technical documents some of which are referenced in the following description, and include 3GPP TS 22.228, TS 23.228, TS 24.229, TS 29.228, TS 29.229, TS 29.328 and TS 29.329 Releases 5 to 7, and TS24.173 Release 7.) IMS provides key features to enrich the end-subscriber person-to-person communication experience through the use of standardised NS Service Enablers, which facilitate new rich person-to-person (client-to-client) communication services as well as person-to-content (client-to-server) services over IP-based networks.

The IMS makes use of the Session Initiation Protocol (SIP) to set up and control calls or sessions between subscriber terminals (or subscriber terminals and application servers). Whilst SIP was created as a subscriber-to-subscriber protocol, IMS allows operators and service providers to control subscriber access to services and to charge subscribers accordingly.

Figure 1:
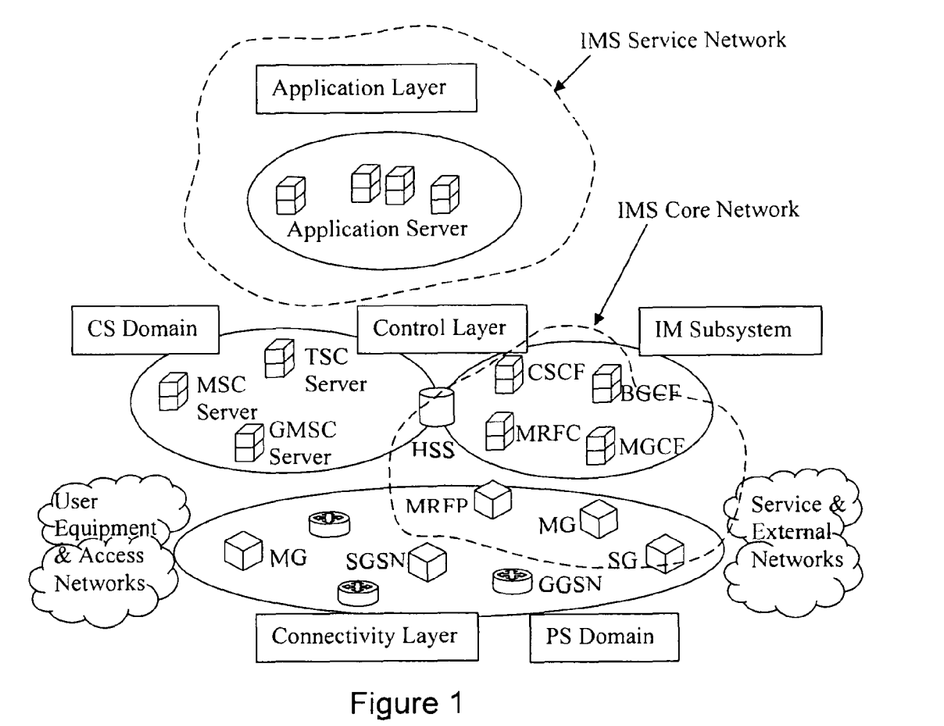
FIG. 1 illustrates schematically the integration of an IP Multimedia Subsystem into a 3G mobile communications system.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the subscriber; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. Application Servers provide services to end users in an IMS system, and may be connected either as end-points over the 3GPP defined Mr interface, or "linked in" by an S-CSCF over the 3GPP defined ISC interface.

The S-CSCF is the central node of the signaling plane. It is a SIP server, but performs session control as well. It uses Diameter Cx and Dx interfaces to download and upload user profiles to/from the user's Home Subscriber Server (HSS). The S-CSCF handles SIP registrations, and is in the path of all signaling messages, so that it can inspect every message in a session. It decides to which application server(s) the SIP message will be forwarded for the provision of services and it provides routing services. Most IMS networks will include multiple S-CSCFs to ensure availability of services to users and to distribute the signaling load. These S-CSCFs may be located over a wide geographical area.

According to current standards (see 3GPP TS 23.380) if a S-CSCF fails, the registration state of the failed S-CSCF can be restored at another S-CSCF so that operations can continue. However, when the user equipment (UE) that was allocated to the failed S-CSCF has been re-allocated to the new S-CSCF, this new S-CSCF may be located in a different region of the country than the UE. For example, the UE and the S-CSCF originally allocated to it may be in the West Coast region of the USA, whereas the new S-CSCF is in the East Coast region. It is clearly less efficient to direct signals over large distances, but for as long as the original S-CSCF is out of action, this may be acceptable. When the S-CSCF originally allocated to the user (which may be geographically close), it is preferable to switch the user back to this original S-CSCF.

Various proposals have been made for switching a user over to the "optimal" S-CSCF. One proposal is to use Administrative Deregistration procedures according to 3GPP TS 29.228. However, this will always terminate any existing sessions and dialogs that exist in the S-CSCF. This means that if the user is in a call, the call will be terminated.

Another proposal is to use re-selection procedures initiated by the I-CSCF. In this case, the I-CSCF first detects that the current S-CSCF is not optimal and needs to be re-selected, and secondly probes the current S-CSCF to check if there are active sessions in the current S-CSCF, and if not, selects a new, more optimal S-CSCF. (See 3GPP TR23.812 and until the latest version of this Technical report is available, see SA2 contribution S2-091406). One drawback with this proposal is that the re-allocation can only be done during a re-registration procedure. In addition, new functionality needs to be introduced both to detect that the S-CSCF needs to be changed and to re-select it. Furthermore, the proposed solution will introduce a new forking behavior in the I-CSCF (i.e., first try the current S-CSCF, and then try the new S-CSCF). This makes the I-CSCF stateful and changes the underlying principle of the I-CSCF functionality. These changes in the I-CSCF would also be quite expensive to implement. Finally, race conditions may arise if two UEs attempt to register at the same time.

In addition, neither of the proposed solutions described above take into account that even when a UE is not registered in IMS, a S-CSCF may still be allocated to a user for unregistered services.

SUMMARY

According to a first aspect the invention provides a method of changing allocation of S-CSCFs to a user of an IMS network. The user is being provided with services via a first S-CSCF allocated to the user. The method comprises: implementing a re-allocation procedure at the first S-CSCF, based on a reallocation instruction and including criteria for de-allocation of the user from the first S-CSCF; determining if the criteria are met; and if the criteria are met, de-allocating the user from the first S-CSCF.

The allocation of a S-CSCF to a user may comprise either registration of the user in the S-CSCF or assignment of the S-CSCF to the user for the provision of unregistered services. The de-allocation may comprise either de-registering the user or de-assigning the S-CSCF from the user. The criteria for de-allocation may comprise de-allocation criteria, wherein a registered user is to be de-registered, or the S-CSCF assigned to the user is to be de-assigned, if the criteria are met. The criteria may include a no-active-session deregistration or de-assignment criteria, wherein the user is to be de-registered or its S-CSCF de-assigned if the user is not engaged in an active IMS session. Alternatively, the criteria may include session-specific deregistration or de-assignment criteria, wherein the user is not to be deregistered or its S-CSCF de-assigned if the user is engaged in one or more certain type of session and/or dialog.

The method may further comprise sending the re-allocation instruction together with associated criteria from the user's HSS to the first S-CSCF via the Cx interface.

Alternatively, the re-allocation instruction and associated criteria may be received from a network system entity other than the user's HSS or the first S-CSCF. For example, the network system entity may comprise a load balancing function. Alternatively, the re-allocation instruction may be generated by local logic within the first S-CSCF.

The method may further comprise sending a response to the user's HSS to confirm that the de-allocation of the first S-CSCF has been completed.

The method may further comprise allocating a second S-CSCF to the user for the provision of services.

The method may further comprise sending an error message to the user's HSS to indicate that that the criteria for de-allocation have not been met.

The allocation instruction and the de-allocation criteria may be provided to the first S-CSCF at different times.

It is an advantage that the re-allocation of S-CSCFs does not involve making any changes to the functionality of the I-CSCF, or other network entities. The impact of the changes required is small, limited only to the Cx interface and some functionality within the S-CSCF. This is an inexpensive and simple option compared with other proposed solutions, and avoids adding greater complexity to IMS networks. In addition, the control of the re-allocation and the decisions about when and to which S-CSCF to re-allocate can all be made by the network management system through the user's HSS. It is a further advantage that the procedures enable re-allocation both where a user has registered with the IMS and where the S-CSCF is only assigned to a user for the provision of unregistered services.

According to a second aspect, the invention provides an S-CSCF for an IMS network. The S-CSCF is configured to implement a re-allocation procedure based on a reallocation instruction and criteria for de-allocation in relation to a user being provided with services via the S-CSCF. If the criteria are met the S-CSCF de-allocates itself as a provider of services to the user.

The reallocation instruction and associated criteria may be included in one or more messages received via a Cx interface of the S-CSCF. Alternatively, the S-CSCF may be further configured to generate the re-allocation instruction within local logic in the S-CSCF.

DETAILED DESCRIPTION

In the discussion below the term 'allocation' of an S-CSCF is used refer both to the situation where a UE is registered with an S-CSCF and where the user is not registered in IMS, but still has an S-CSCF assigned for the provision unregistered services. Thus, the solution described enables the re-allocation of an S-CSCF both when the user is registered, and where an un-registered user has an assigned S-CSCF, and needs to be moved to another S-CSCF.

Accordingly, where re-allocation involves de-allocating an S-CSCF, then this may involve de-registration, which is the procedure of actively de-registering the user (with all its identities) from the S-CSCF. This involves the procedures of notifying UE(s) and ASs that may have subscribed to notification of registration status, that the user is being de-registered. As a result of de-registration, a UE can decide to initiate a new registration according to standard procedures.

De-allocation may otherwise involve de-assigning an S-CSCF, which is a procedure of dropping the state in the active S-CSCF holding the user, without making any notification to the user. This procedure would be equivalent to S-CSCF failure, and would automatically invoke restoration procedures that would restore the state in a new S-CSCF.

Figure 2:
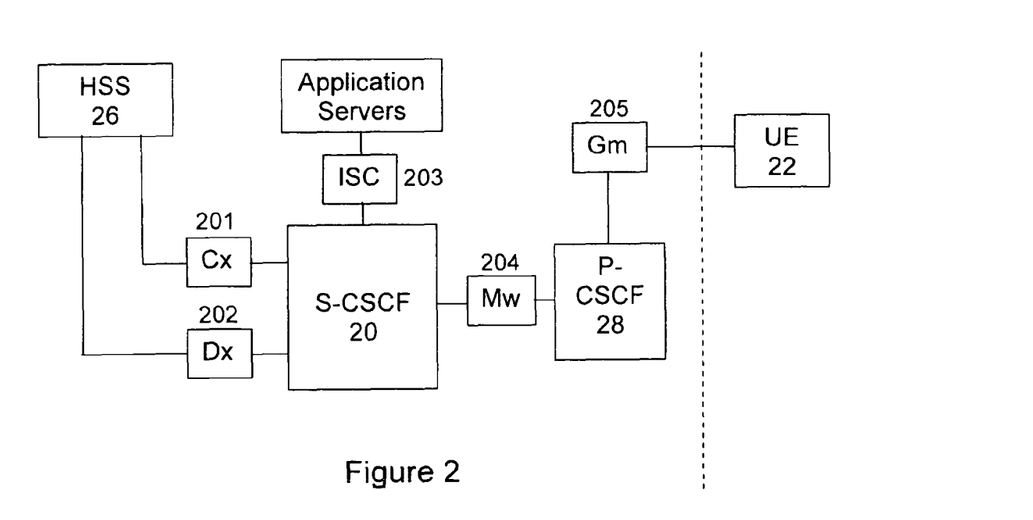
FIG. 2 is a schematic illustration showing a S-CSCF and certain associated interfaces with other entities.

Referring to FIG. 2, there is shown a schematic representation of an S-CSCF 20, which is linked to other entities of the IMS network via various interfaces. These include the Cx interface 201 and the Dx interface 202, through which signals communicate between the S-CSCF 20 and a HSS 24. The S-CSCF 20 uses the Diameter protocol for these signals for downloading and uploading user profiles.

The S-CSCF 20 also determines to which AS(s) SIP message will be forwarded in order for them to provide their services. The ISC interface 203 is used for exchanging messages between the S-CSCF 20 and an AS.

Signals between the CSCFs are exchanged through the Mw interface 204. These include signals to and from a user's UE 22, which accesses the IMS through a P-CSCF 28 via the Gm interface 205.

Figure 3:
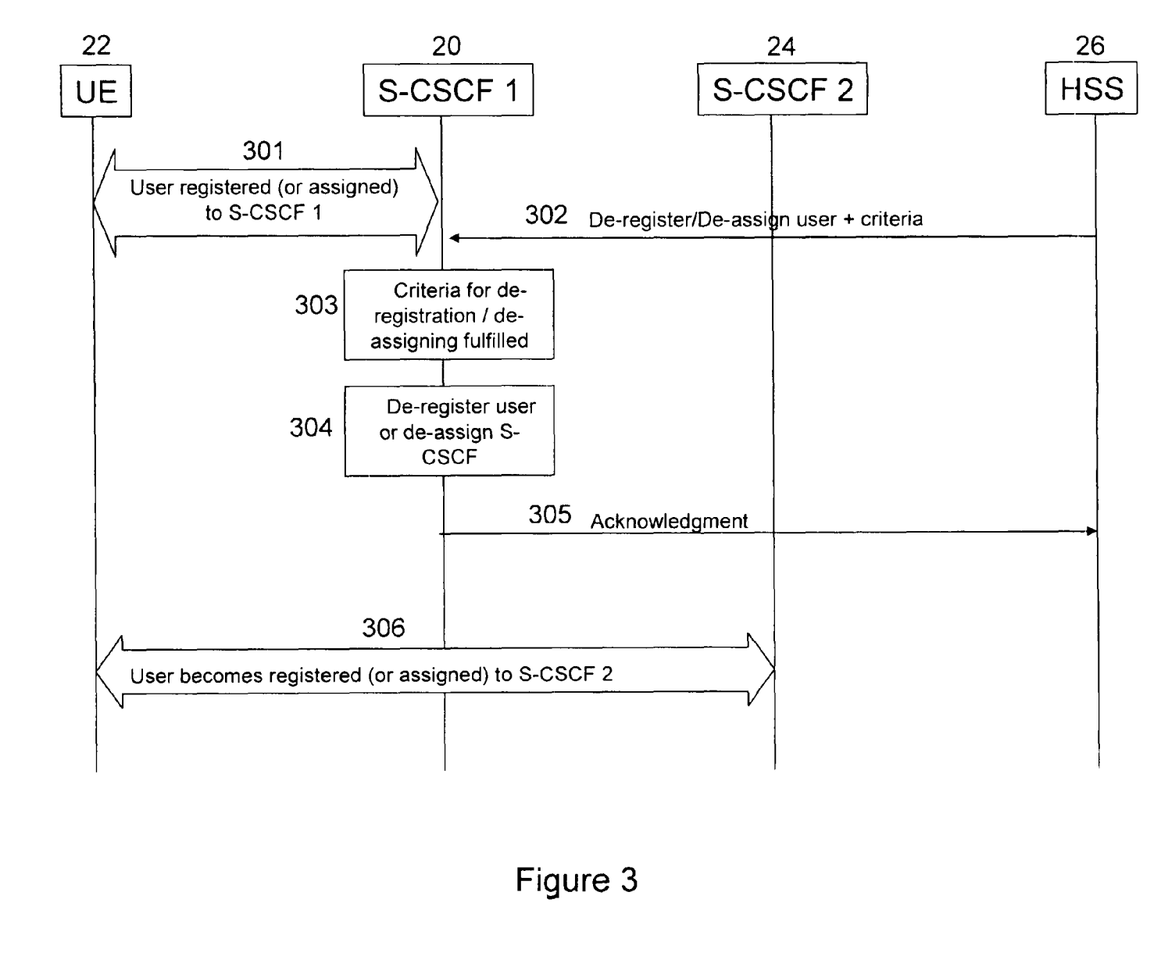
FIG. 3 is signal flow diagram showing the basic signals for implementing a reallocation of S-CSCFs.

FIG. 3, illustrates the basic signalling flow for the procedure of re-allocating an S-CSCF. The network entities and UE 22 carry the same reference numerals as shown in FIG. 2. As shown at the outset (step 301) a first S-CSCF 20, S-CSCF1, is allocated to a user 22, which is not optimal (for example, as described above the user 22 may have been moved to S-CSCF1 20 as a result of an originally allocated S-CSCF going down). Instead, S-CSCF2 24 would be the preferred proxy to use (for example due to its geographical location/proximity to the user 22). As explained above the allocation of the S-CSCF1 20 to the user 22 may either be because the user 22 is registered with the S-CSCF1 20, or because the S-CSCF 1 20 has been assigned to the user for the provision of unregistered services.

At some point in time, it is decided to change the allocation so that S-CSCF 2 24, which is seen as the optimal S-CSCF, is allocated to the user 22. In the example illustrated in FIG. 3, at step 302 the user's HSS 26 issues an instruction for the re-allocation, which is sent to the S-CSCF1 20 through the Cx interface. Note that the decision to change need not have been made by the HSS 26 itself, but may have originated somewhere else in the IMS network.

For example, a load balancing function might be employed, that would monitor the load on each S-CSCF and would be programmed to re-distribute the load in the event of a detected imbalance. One example of this type of function is described in 3GPP TR 23.812. Another possibility is that local logic may be employed in the S-CSCF that enables it to determine that a user allocated to it should be moved to another S-CSCF.

The re-allocation instruction at step 302 will trigger the de-allocation (i.e. the de-registration of the user 22 from S-CSCF1 20, or de-assignment of S-CSCF1 20 from user 22). However, the instruction includes criteria that must be met before the de-allocation is implemented. In a simple form the instruction and criteria could be an Administrative Deregistration request with a new value stating DE-REG-ISTER-IF-NO-ACTIVE-SESSIONS. More advanced criteria could include taking account of different types of session and/or dialogs that may exist. For example the criteria might indicate that the S-CSCF should only de-register the user if no SIP INVITE sessions exist, or if no SIP INVITE sessions of service MMTEL exist.

In the embodiment shown in FIG. 3, the re-allocation instruction and the criteria are sent together to the S-CSCF1 20 in step 302. However, it is possible that, for example, a determination could be made at an early stage that the S-CSCF1 20 is not optimal, but the criteria for de-allocating S-CSCF1 20 from the user could depend on other factors (such as the amount of signal traffic, or the availability of other S-CSCFs, etc.). In that case, the HSS 26 could wait until a later time before sending the de-allocation criteria to the S-CSCF1 20. Another possibility is that the HSS 26 could wait until another event arises that causes it to send a signal to the S-CSCF1 20 (such as re-registration or termination of a session by the user) and the HSS 26 sends the criteria to the S-CSCF1 20 at that stage. Alternatively, the order could be reversed such that the de-allocation criteria are sent first to the S-CSCF1 20, and the actual re-allocation instruction is sent later, for example when another event arises.

Triggered by the reallocation instruction, at step 303 the S-CSCF1 20 evaluates whether or not the de-allocation criteria are fulfilled. In the scenario illustrated in FIG. 3, it is assumed that the criteria are fulfilled, but see the discussion of FIGS. 4 and 5 below for other scenarios. Then at step 304, the S-CSCF1 20 carries out the de-allocation by either de-registering the user 22 (if the user is registered with it), or de-assigning the S-CSCF1 20 from the user 22 if it has been assigned to the user for provision of unregistered services.

At step 305, the S-CSCF1 20 sends an acknowledgement response to the user's HSS 26 to indicate that the requested de-registration/de-assignment has been completed.

At this point, one of two things may happen. If the user 22 was de-registered, it will try to re-register with the IMS. The preferred new S-CSCF (S-CSCF2 24), assuming it is available, will be allocated according to standard procedures (see TS 23.228/TS 29.228). On the other hand, if the S-CSCF 1 only de-assigned itself from the user 22, then restoration procedures according to TS 23.380 will allocate the new S-CSCF2 24 to be assigned to the user for continuing the provision of unregistered services. The selection of the S-CSCF2 24 (i.e. the determination that this is the optimal S-CSCF for the user) may be based on originating or terminating traffic. Alternatively, the S-CSCF2 could be selected as a result of a new registration by a UE of the user 22.

Figure 4:
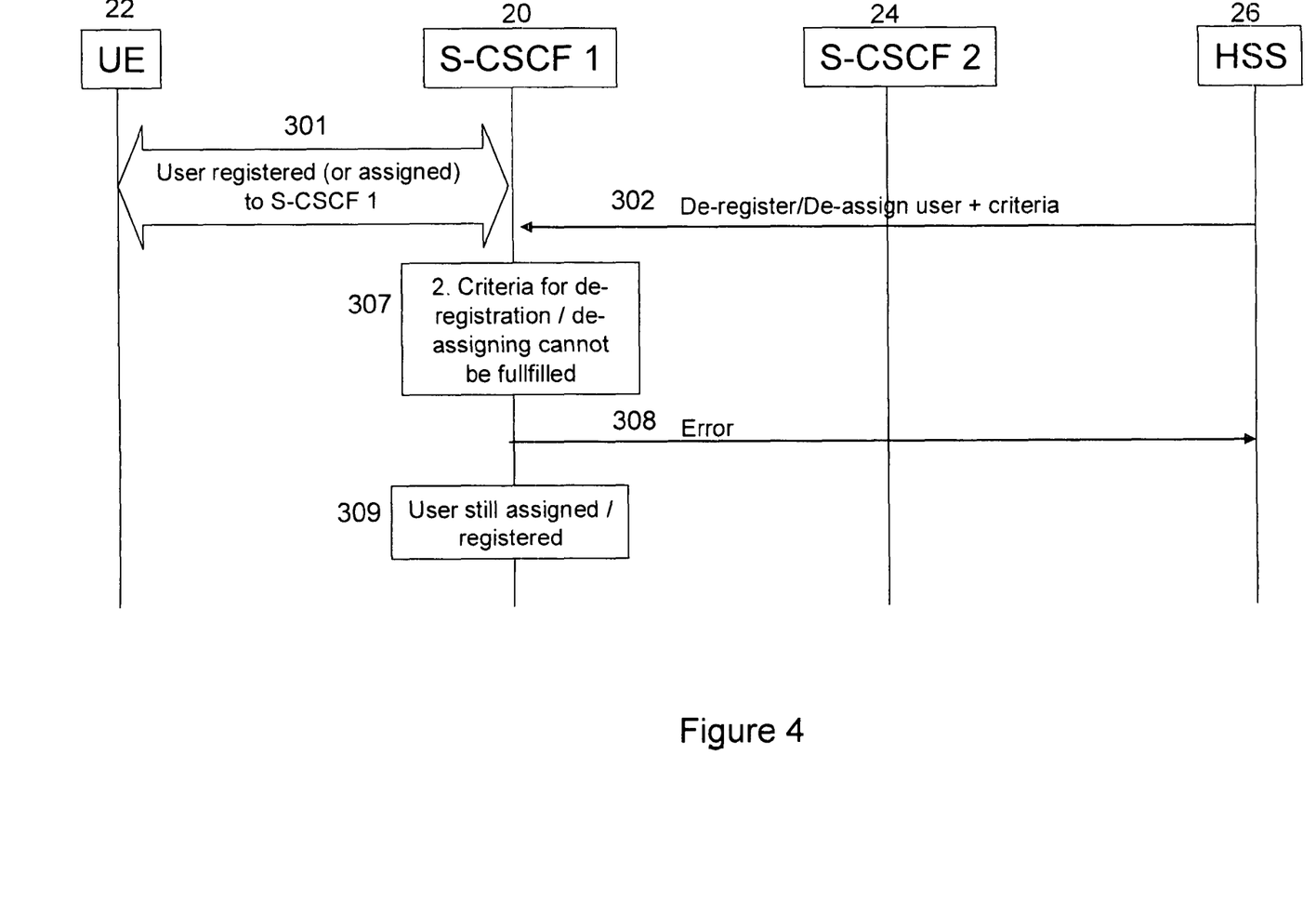
FIG. 4 is a signal flow diagram illustrating the basic signals when re-allocation as shown in FIG. 3 cannot be performed.

FIG. 4 illustrates the basic signal flows for the situation where the S-CSCF1 20 determines that the de-allocation criteria are not fulfilled. The network entities and the signals at steps 301 and 302 are the same as described above, and carry the same reference numerals as in FIG. 3. However, in this case instead of determining that the de-allocation criteria are fulfilled (as at step 303 in FIG. 3), at step 307, the S-CSCF1 20 determines that the de-allocation criteria are not fulfilled. As a consequence, the S-CSCF1 20 does not de-allocate (de-register the user, or de-assign itself) but instead, at step 308, it responds by sending an error signal to the user's HSS 26. The S-CSCF1 20 remains allocated to the user, as shown at step 309.

Figure 5:
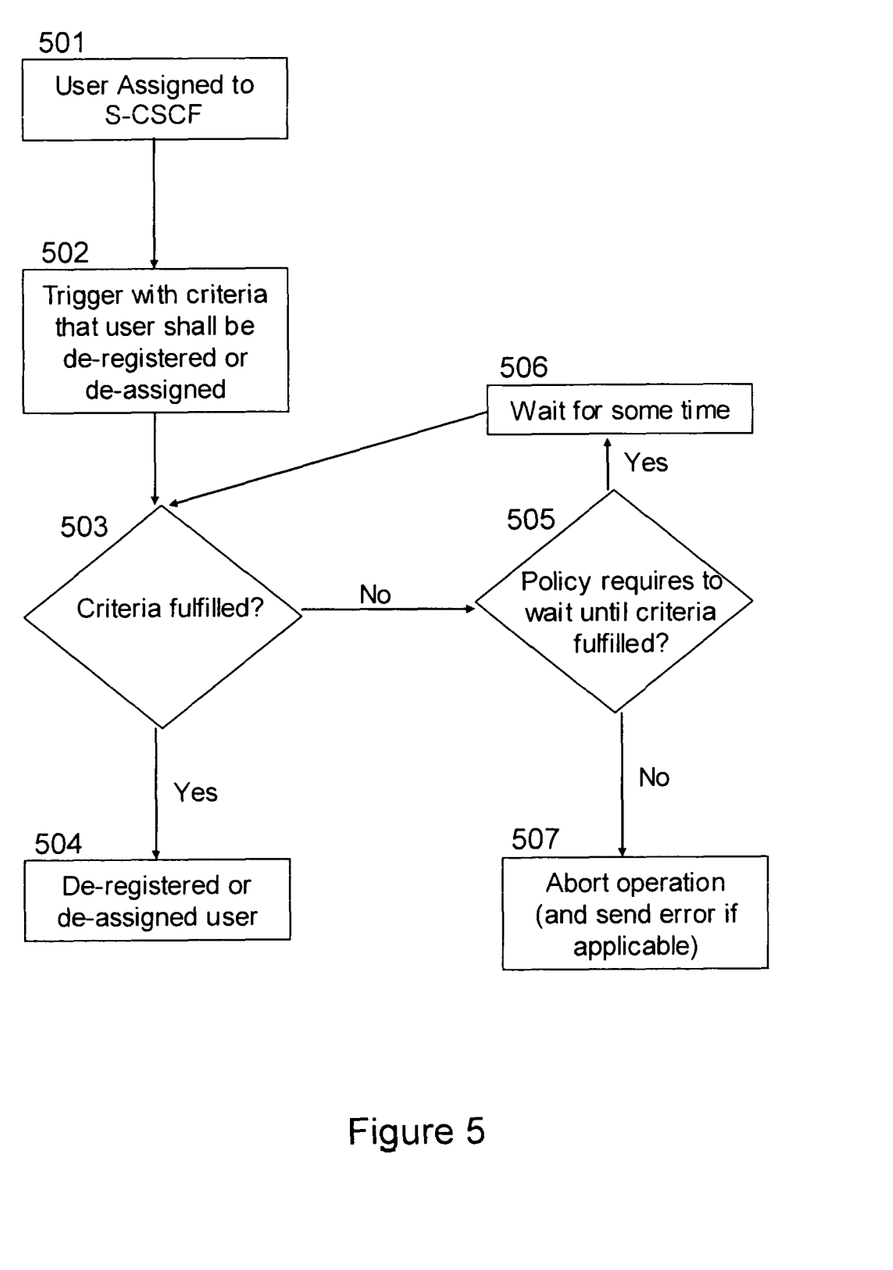
FIG. 5 is a flow diagram illustrating the functionality required for implementation of the re-allocation of S-CSCFs.

FIG. 5 details the high-level logic of the S-CSCF for implementing the re-allocation procedures shown in FIG. 3 and FIG. 4. At step 501, the S-CSCF is serving a registered user or has been assigned to provide unregistered services to the user. At step 502 the S-CSCF receives a trigger instruction, together with associated criteria, for the de-allocation, either by de-registering the user or by de-assigning itself from the user. At step 503, the S-CSCF determines if the criteria are fulfilled, and if they are proceeds to step 504 where it de-registers the user or de-assigns itself, after which it sends an acknowledgement to the user's HSS.

If, at step 503, the S-CSCF determines that the criteria are not fulfilled, it proceeds to step 505. Here a further determination is made, which depends on the network operator policy. The policy may require the S-CSCF to keep trying so that the de-allocation can occur when the criteria are fulfilled. In that case the S-CSCF proceeds to wait for a specified time, as shown at step 506, and then return to step 503 to determine if the criteria are fulfilled. For example, if the criteria specify not to de-register the user if it is engaged in an active session, and at step 503 the S-CSCF determines that the user is engaged in a call, then, if the policy requires this, at step 505 the S-CSCF may wait, for say five or ten minutes at step 506, before trying again to see if the session has finished. However, if at step 505 there is no such policy requirement, the S-CSCF proceeds to step 507 where it aborts the de-allocation and, if applicable, sends an error message to the HSS, as at step 308 in FIG. 4.

It will be seen that the procedures described above do not involve making any changes to the functionality of the I-CSCF, or other network entities. In addition, the control of the re-allocation and the decisions about when and to which S-CSCF to re-allocate can all be made by the network management system through the user's HSS. Moreover, the procedures enable re-allocation both where a user has registered with the IMS and where the S-CSCF is only assigned to a user for the provision of unregistered services.

The invention claimed is:

1. A method of changing allocation of serving Call Session Control Functions (S-CSCFs) to a user equipment (UE) of an IP Multimedia Subsystem (IMS) network, wherein the UE is being provided with services via a first S-CSCF allocated to the UE, the method comprising:
receiving at the first S-CSCF criteria for de-allocating the first S-CSCF from the UE, the received criteria specifying one or more conditions that are required to be met prior to de-allocating the first S-CSCF from the UE;
receiving at the first S-CSCF a de-allocation instruction;
in response to receipt of the deallocation instruction, the first S-CSCF determining if the one or more conditions specified in the criteria are met; and
if the one or more conditions specified in the criteria are met, the first S-CSCF de-allocating itself from the UE, the one or more conditions including:

(i) a no-active-session deregistration or de-assignment criteria, wherein the user is to be de-registered or the first S-CSCF de-assigned if the user is not engaged in an active IMS session,
(ii) session specific deregistration or deassignment criteria, wherein the UE is not to be deregistered or the first S-CSCF deassigned if the UE is engaged in an active IMS session, and
(iii) deregistration criteria that is dependent on a status of a communication session of the UE, and
wherein the received criteria for de-allocating the first S-CSCF is included in an instruction received from a home subscriber server (HSS) for re-allocating the UE for the first S-CSCF.

2. The method of claim 1, wherein the allocation of a S-CSCF to a user comprises either registration of the user with the S-CSCF or assignment of the S-CSCF to the user for the provision of unregistered services, and wherein de-allocation comprises either de-registering the user or de-assigning the S-CSCF from the user.

3. The method of claim 2, wherein a registered user is to be de-registered or the S-CSCF assigned to the user is to be de-assigned if the criteria are met.

4. The method of claim 1, further comprising sending the re-allocation instruction and associated criteria from the UE's HSS to the first S-CSCF via the Cx interface.

5. The method of claim 1, wherein the re-allocation instruction and associated criteria are received from a network system entity other than the UE's HSS or the first S-CSCF.

6. The method of claim 5, wherein the network system entity comprises a load balancing function.

7. The method of claim 1, wherein the re-allocation instruction is generated by local logic within the first S-CSCF.

8. The method of claim 1, further comprising sending a response to the UE's HSS to confirm that the de-allocation of the first S-CSCF has been completed.

9. The method of claim 1, further comprising allocating a second S-CSCF to the UE for the provision of services.

10. The method of claim 1, further comprising sending an error message to the UE's HSS to indicate that that the criteria for de-allocation have not been met.

11. The method of claim 1, wherein the re-allocation instruction and the de-allocation criteria are provided to the first S-CSCF at different times.

12. A serving Call Session Control Functions (S-CSCF) for an IP Multimedia Subsystem (IMS) network, configured to:
implement a re-allocation procedure based on a re-allocation instruction and criteria for de-allocation in relation to a user equipment (UE) being provided with services via the S-CSCF, the criteria specifying one or more conditions that are required to be met prior to de-allocating the S-CSCF from the UE, wherein if the S-CSCF determines that the one or more conditions included in the criteria are met, the S-CSCF de-allocates itself as a provider of services to the user, the one or more conditions including:
(i) a no-active-session deregistration or de-assignment criteria, wherein the user is to be de-registered or the first S-CSCF de-assigned if the user is not engaged in an active IMS session,
(ii) session-specific deregistration or deassignment criteria, wherein the UE is not to be deregistered or the first S-CSCF deassigned if the UE is engaged in an active IMS session, and
(iii) deregistration criteria that is dependent on a status of a communication session of the UE,
wherein the received criteria for de-allocating the first S-CSCF is included in an instruction received from a home subscriber server (HSS) for re-allocating the UE for the first S-CSCF.

13. The S-CSCF of claim 12, wherein the re-allocation instruction and de-allocation criteria are included in one or more messages received via a Cx interface of the S-CSCF.

14. The S-CSCF of claim 12, further configured to generate the re-allocation instruction within local logic in the S-CSCF.

15. A Service-Call Session Control Function (S-CSCF) reallocation method, comprising:
an S-CSCF providing session control for a user equipment (UE);
the S-CSCF receiving criteria for de-allocating the S-CSCF from the UE, the received criteria specifying one or more conditions that are required to be met prior to de-allocating the S-CSCF from the UE;
the S-CSCF, in response to a reallocation trigger, determining whether the one or more conditions specified in the criteria are met; and
the S-CSCF, in response to determining that the one or more conditions specified in the criteria are met, de-allocating the UE from the S-CSCF, the one or more conditions including:
(i) a no-active-session deregistration or de-assignment criteria, wherein the user is to be de-registered or the first S-CSCF de-assigned if the user is not engaged in an active IMS session,
(ii) session-specific deregistration or deassignment criteria, wherein the UE is not to be deregistered or the first S-CSCF deassigned if the UE is engaged in an active IMS session, and
(iii) deregistration criteria that is dependent on a status of a communication session of the UE,
wherein the received criteria for de-allocating the first S-CSCF is included in an instruction received from a home subscriber server (HSS) for re-allocating the UE for the first S-CSCF.

16. The S-CSCF reallocation method of claim 15, wherein:
the method further comprises the S-CSCF receiving a registration request from the UE prior to the S-CSCF providing the session control for the UE and the S-CSCF registering the UE as a result of the registration request, and
the step of de-allocating the UE comprises de-registering the UE with the S-CSCF.

17. The S-CSCF reallocation method of claim 15, wherein the reallocation trigger is the receipt of a message comprising a reallocation instruction transmitted by a home subscriber server (HSS) that manages subscription-related information.

18. The S-CSCF reallocation method of claim 15, wherein the message further comprises information identifying the de-allocation criteria.

19. The method according to claim 1, wherein the criteria is received from a Home Subscriber Server (HSS) associated with the UE.

20. The method of claim 1, wherein the one or more conditions specified in criteria for de-allocating the first S-CSCF includes session-specific deregistration criteria wherein the first S-CSCF is not to be de-allocated from the UE if the UE is engaged in one or more certain type of session and/or dialog.

* * * * *

UNITED STATES PATENT AND TRADEMARK OFFICE
CERTIFICATE OF CORRECTION

PATENT NO. : 9,560,084 B2
APPLICATION NO. : 13/256962
DATED : January 31, 2017
INVENTOR(S) : Lindholm et al.

It is certified that error appears in the above-identified patent and that said Letters Patent is hereby corrected as shown below:

On the Title Page

In item (75), under "Inventors", in Column 1, Line 2, delete "Hagersten" and insert -- Hägersten --, therefor.

In the Specification

In Column 1, Line 29, delete "NS" and insert -- IMS --, therefor.

In Column 1, Line 43, delete "Call/Session" and insert -- Call Session --, therefor.

In Column 4, Line 46, delete "Fig. 3," and insert -- Fig. 3 --, therefor.

In Column 4, Line 58, delete "S-CSCF 1" and insert -- S-CSCF1 --, therefor.

In Column 4, Line 61, delete "S-CSCF 2" and insert -- S-CSCF2 --, therefor.

In Column 4, Line 63, delete "step 302" and insert -- step 302, --, therefor.

In Column 5, Line 59, delete "S-CSCF 1" and insert -- S-CSCF1 --, therefor.

In Column 6, Line 18, delete "step 502" and insert -- step 502, --, therefor.

In Column 6, Line 34, delete "step 503" and insert -- step 503, --, therefor.

In Column 6, Line 36, delete "step 505" and insert -- step 505, --, therefor.

In Column 6, Line 38, delete "step 505" and insert -- step 505, --, therefor.

Signed and Sealed this
Second Day of May, 2017

Michelle K. Lee
*Director of the United States Patent and Trademark Office*

CERTIFICATE OF CORRECTION (continued)
U.S. Pat. No. 9,560,084 B2

In the Claims

In Column 7, Line 5, in Claim 1, delete "session specific" and insert -- session-specific --, therefor.

In Column 8, Line 13, in Claim 15, delete "Service-Call" and insert -- Serving-Call --, therefor.